United States Patent
Wey et al.

(10) Patent No.: US 10,404,399 B2
(45) Date of Patent: Sep. 3, 2019

(54) DYNAMIC EQUALIZATION OF DIFFERENTIAL PATH LOSS IN AN OPTICAL DISTRIBUTION NETWORK

(71) Applicant: ZTE Corporation, Shenzhen, Guangdong (CN)

(72) Inventors: Jun Shan Wey, Sammamish, WA (US); Junwen Zhang, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/957,844

(22) Filed: Apr. 19, 2018

(65) Prior Publication Data

US 2018/0309534 A1    Oct. 25, 2018

Related U.S. Application Data

(60) Provisional application No. 62/487,268, filed on Apr. 19, 2017.

(51) Int. Cl.
*H04J 14/02* (2006.01)
*H04B 10/2507* (2013.01)
(Continued)

(52) U.S. Cl.
CPC ...... *H04J 14/0221* (2013.01); *H04B 10/0799* (2013.01); *H04B 10/2507* (2013.01);
(Continued)

(58) Field of Classification Search
CPC ............ H04J 14/0221; H04B 10/0799; H04B 10/616; H04B 10/2507; H04B 10/272; H04Q 11/0067
(Continued)

(56) References Cited

U.S. PATENT DOCUMENTS 7,554,720 B2    6/2009  Murakami et al.
9,306,697 B2 *  4/2016  Roberts ............ H04B 10/07955
(Continued)

FOREIGN PATENT DOCUMENTS

CN    103997696    8/2014

OTHER PUBLICATIONS

ITU-T G.989.2 "40-Gigabit-capable passive optical networks 2 (NG-PON2): Physical media dependent (PMD) layer specification," Series G: Transmission Systems and Media, Digital Systems and Networks, Telecommunication Standardization Sector of International Telecommunications Union, 108 pages, Dec. 2014.
(Continued)

*Primary Examiner* — Oommen Jacob
(74) *Attorney, Agent, or Firm* — Perkins Coie LLP

(57) ABSTRACT

The differences in the power received from multiple optical network units connected to an optical hub may exceed an allowable dynamic range. The dynamic range may be reduced by determining the power received at the optical hub from each optical network unit and adjusting the power transmitted from one or more optical network units to reduce the overall dynamic range. For each optical network unit, the hub may determine the received optical power in an upstream signal from the optical network unit and receive a digital representation of the transmitted power. The hub may determine to adjust the optical power sent from one or more of the optical network units to reduce the dynamic range. The adjustments to the optical powers at the optical network units may be performed by sending commands from the optical hub to each adjusted optical network unit via a downstream signal.

23 Claims, 5 Drawing Sheets

(51) Int. Cl.
  *H04B 10/61* (2013.01)
  *H04B 10/079* (2013.01)
  *H04Q 11/00* (2006.01)

(52) U.S. Cl.
  CPC ....... *H04B 10/616* (2013.01); *H04Q 11/0067* (2013.01); *H04Q 2011/0064* (2013.01); *H04Q 2011/0083* (2013.01)

(58) Field of Classification Search
  USPC ............... 398/79, 35, 38, 58, 63, 66, 68
  See application file for complete search history.

(56) References Cited

U.S. PATENT DOCUMENTS

| | | | | |
|---|---|---|---|---|
| 2006/0120732 A1* | 6/2006 | Baek | H04B 10/66 | 398/202 |
| 2008/0056720 A1* | 3/2008 | Sitton | H04B 10/27 | 398/98 |
| 2009/0080891 A1* | 3/2009 | Kazawa | H04J 3/0682 | 398/79 |
| 2009/0175303 A1* | 7/2009 | Zhang | H04B 10/572 | 372/26 |
| 2009/0232499 A1* | 9/2009 | Sarashina | H04J 3/1694 | 398/63 |
| 2009/0269053 A1* | 10/2009 | Yang | H04B 10/0791 | 398/22 |
| 2010/0316381 A1* | 12/2010 | de Lind van Wijngaarden | H04J 3/1694 | 398/58 |
| 2011/0200328 A1* | 8/2011 | In De Betou | H04J 3/1694 | 398/38 |
| 2011/0255866 A1* | 10/2011 | Van Veen | H04B 10/07955 | 398/35 |
| 2012/0057876 A1* | 3/2012 | Liu | H04B 10/296 | 398/82 |
| 2012/0176667 A1* | 7/2012 | He | H04B 10/2942 | 359/344 |
| 2012/0230678 A1* | 9/2012 | In De Betou | H04L 7/041 | 398/27 |
| 2013/0004161 A1* | 1/2013 | Xia | H04Q 11/0067 | 398/25 |
| 2013/0148968 A1* | 6/2013 | Takizawa | H04L 7/04 | 398/66 |
| 2014/0199076 A1 | 7/2014 | Yu et al. | | |
| 2014/0233940 A1* | 8/2014 | Pitzer | H04B 10/03 | 398/8 |
| 2014/0270779 A1* | 9/2014 | Lee | H04J 14/025 | 398/79 |
| 2015/0318928 A1* | 11/2015 | Yoo | H04J 14/0282 | 398/25 |
| 2016/0065313 A1 | 3/2016 | Yu et al. | | |
| 2016/0080105 A1* | 3/2016 | Khotimsky | H04J 14/0232 | 398/34 |
| 2016/0211939 A1 | 7/2016 | Yu et al. | | |
| 2016/0248540 A1 | 8/2016 | Yu et al. | | |
| 2016/0285657 A1 | 9/2016 | Yu et al. | | |

OTHER PUBLICATIONS

Naughton, A., et al., "Design Optimization of R-EAM-SOA for Long-Reach Carrier-Distributed Passive Optical Networks," Journal of Lightwave Technology, 32(22):3784-3790, Nov. 2014.

Straullu, S., et al., "Compatibility between coherent reflective burst-mode PON and TWDM-PON physical layers," Optics Express, 22(1):9-14, Jan. 2014.

Office Action for Chinese Application No. 201810349674.0, dated Jun. 26, 2019 (3 pages).

* cited by examiner

DYNAMIC EQUALIZATION OF DIFFERENTIAL PATH LOSS IN AN OPTICAL DISTRIBUTION NETWORK

CROSS REFERENCE TO RELATED APPLICATIONS

This patent document claims the benefit of priority of U.S. Provisional Patent Application No. 62/487,268, filed on Apr. 19, 2017. The entire content of the before-mentioned patent application is incorporated by reference as part of the disclosure of this document.

TECHNICAL FIELD

The present disclosure relates to optical networks.

BACKGROUND

Optical networks provide a backbone for high-speed digital communications. A single wavelength channel in a fiber can support data rates of 10 gigabits per second (GBPS), and a single fiber can support multiple wavelength channels for a total data rate on the fiber of 100 GBPS, or more. In a passive optical network, an optical line terminal (OLT) may connect to multiple optical nodes where each connection is via one or more different fibers. The optical nodes may be separated by large distances and positioned at different distances from the OLT. For example, an optical node may be many kilometers away from the hub and the optical nodes may be many kilometers from one another. Accordingly, optical nodes may communicate with the optical hub over different lengths of fiber. Associated with the different lengths of fiber are different optical path losses that result in different optical powers at the hub. New technology is needed to accommodate the different optical powers at the hub.

SUMMARY

Apparatuses, methods, and systems are disclosed. In one aspect an optical network system is disclosed. The system may include an optical hub including an optical detector. The system may further include a first optical node including a first optical source coupled to the optical hub through a first optical fiber having a first optical path loss, and/or a second optical node including a second optical source coupled to the optical hub through a second optical fiber having a second optical path loss. The system may further include an optical distribution network including a power splitter or a wavelength division multiplexer, the first fiber, and the second fiber. The optical detector may determine a first optical power received from the first optical source through the first optical fiber. The optical detector may determine a second optical power received from the second optical source through the second optical fiber. The optical hub may compare the first optical power to the second optical power. When the first optical power exceeds the second optical power by a predetermined threshold, the optical hub may generate a message to be sent to the first optical node to cause an adjustment to the first optical power to exceed the second optical power by less than the predetermined threshold.

The following features may in included in any combination. The message may include a command to adjust an optical power of a laser at the first optical node. The message may include a command to adjust a gain of an optical amplifier at the first optical node. The first optical node may send a message to the optical hub indicative of the first optical path loss and/or the second optical node may send another message to the optical hub indicative of the second optical path loss. The hub may determine the adjustment based on the first optical path loss and the second optical path loss. The first optical node may register with the optical hub by sending a first identifier and the second optical node may register with the optical hub by sending a second identifier. A wavelength division multiplexer may separate downstream signals from the optical hub to the first and second optical nodes according to wavelength and may combine upstream signals of different wavelengths from the first optical node and second optical node. The downstream signals from the optical hub to the first and second optical nodes may be separated in time and the power in the downstream signals from the optical hub may be split by a power splitter into portions to the first and second optical nodes. The power splitter may combine upstream signals separated in time from the first optical node and second optical node to provide to the optical hub. The first optical fiber may be longer than the second optical fiber causing the first optical path loss to be greater than the second optical path loss.

In another aspect, an optical communication apparatus is disclosed. The apparatus may include at least one memory, at least one processor, and an optical transceiver. The processor may be configured to read instructions from the memory and implement an optical communication method. The instructions may include code for determining, by an optical detector at an optical hub, a first optical power received from a first optical source at a first optical node through a first optical fiber. The instructions may further include code for determining, by the optical detector at the optical hub, a second optical power received from a second optical source at second optical node through a second optical fiber. The instructions may further include code for code for comparing, at the optical hub, the first optical power to the second optical power. Code may be provided for generating, at the optical hub when the first optical power exceeds the second optical power by a predetermined threshold, a message to be sent to the first optical node to cause an adjustment to the first optical power to exceed the second optical power by less than the predetermined threshold.

In another aspect, an optical system may include an optical hub including an optical detector. The optical detector may determine a first optical power received from a first optical source at a first optical node through a first optical fiber. The optical detector may determine a second optical power received from a second optical source at a second optical node through a second optical fiber. The optical hub may compare the first optical power to the second optical power, wherein when the first optical power exceeds the second optical power by a predetermined threshold, the optical hub generates a message to be sent to the first optical node to cause an adjustment to the first optical power to cause the first optical power to exceed the second optical power by less than the predetermined threshold. The message may include a command to adjust an optical power of a laser at the first optical node. The message may include a command to adjust a gain of an optical amplifier at the first optical node.

In another aspect, an optical network node may include an optical receiver. The optical network node may further include an optical transmitter including an optical source coupled to an optical hub through a first optical fiber having an optical path loss. The optical receiver may be configured to receive a message to cause the optical network node to adjust an optical power of the optical source to exceed another optical power at another optical network node by less than a predetermined threshold. The message may include a command to adjust an optical power of a laser at the first optical node. The message may include a command to adjust a gain of an optical amplifier at the first optical node.

BRIEF DESCRIPTION OF THE DRAWINGS

Where possible, like reference numerals refer to the same or similar features.

DETAILED DESCRIPTION

Figure 1:
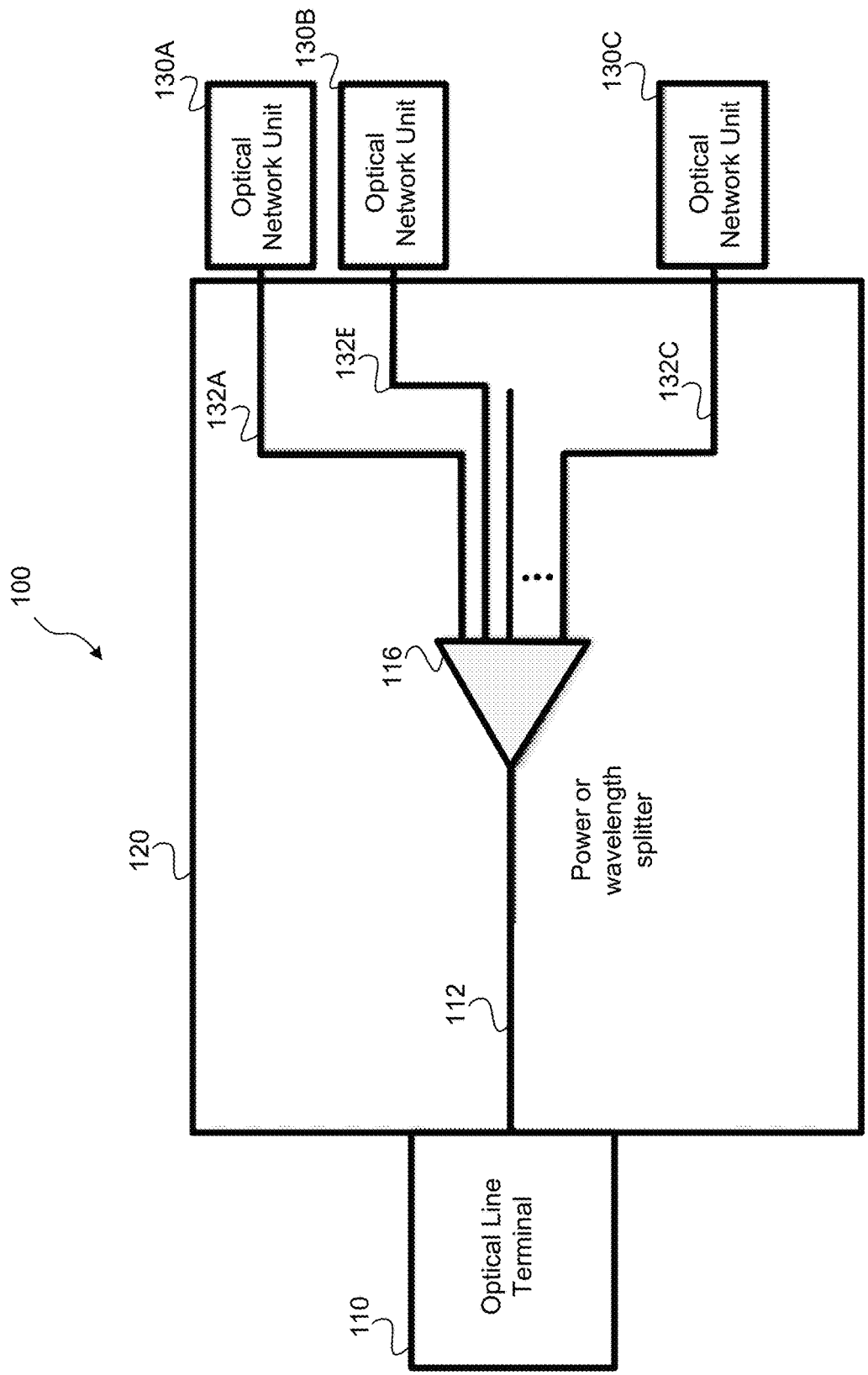
FIG. 1 depicts an optical network, in accordance with some example embodiments.

Passive optical networks include an optical hub (also referred to herein as an optical line terminal), optical network units (also referred to herein as optical nodes, or nodes), and an optical distribution network. The optical distribution network may connect an optical hub to many optical network units where the optical network units may be placed at a variety of distances from the optical hub. Downstream payload and control data may be sent from the optical hub to the optical network units and upstream payload and control data may be sent from the optical network units to the optical hub. Control data may include commands and/or status information. The optical distribution network may include a power or wavelength splitter to split optical signals from the optical hub to the optical network units, and to combine signals from the optical network units to the optical hub.

The different lengths of optical fiber between the multiple optical network units and the optical hub may cause different optical path losses between the hub and each of the optical network units. For example, when each of the optical sources at the optical network units provides the same power and the optical path loss is 10 decibels (dB) greater between the hub and an optical network unit than the path loss between the hub and another optical network unit, the hub will need to accommodate a 10 dB difference in power at the receiver. Reducing the differences in optical power at the hub may reduce the dynamic range within which a receiver at the hub must operate. Continuing the previous example, if a source at the optical network unit corresponding to the longer path with 10 dB more attenuation were increased by 10 dB, then the power received from the more distant optical network unit would be the same as the closer optical network unit thereby reducing the dynamic range needed by the receiver at the hub.

In some example embodiments, the differences in powers received from multiple optical network units connected to an optical hub may be reduced by determining the power received at the hub from each optical network unit and adjusting the power transmitted from one or more optical network units to reduce the dynamic range of the optical signals received from different optical network units at the hub. For example, the dynamic range may represent the difference between the strongest signal received at the optical hub from an optical network unit and the weakest signal received at the optical hub from another optical network unit. Alternatively, dynamic range may refer to the difference between the highest average received power and the lowest average received power from all the optical network units. For each optical network unit, the hub may determine the received optical power in an upstream signal from the optical network unit to the hub. If the powers of the upstream signals are too different, or are different by a predetermined amount, then the hub may determine to adjust the optical power sent from one or more of the optical network units in order to reduce the dynamic range at the hub. The adjustments to the optical powers at the optical network units may be performed by sending commands from the hub to each adjusted optical network unit via a downstream signal to the adjusted to optical network units.

FIG. 1 depicts an optical network 100, in accordance with some example embodiments. Optical network 100 includes optical line terminal (OLT) 110 (also referred herein to as an optical hub), optical distribution network (ODN) 120, and optical network units (ONUs) 130A-130C (also referred to as optical nodes, or nodes).

OLT 110 may be located at a central location such as a central office of a network service provider. OLT 110 may include a plurality of optical transmitters and a plurality of optical receivers. The different optical transmitters and receivers may operate at different wavelengths, or multiple transmitters and receivers may operate at the same wavelength.

OLT 110 may include multiple transmitters. For example, OLT 110 may include optical transmitters to communicate with each ONU 130A-130C. Each transmitter may operate using a different wavelength. The different wavelengths may be carried by fiber 112 and demultiplexed by wavelength division multiplexer/demultiplexer (WDM) 116 to multiple fibers such as fibers 132A-132C. In some example embodiments, one transmitter may generate a signal at a particular wavelength or may generate multiple wavelengths if advanced modulation is used. In some implementations, a WDM may be included in OLT 110 to combine signals at different wavelengths into fiber 112. In another example, 256 OLT transmit signals may be demultiplexed by WDM 116 from fiber 112 to 256 fibers connected to 256 ONUs. A wavelength division multiplexer may be the same device as a wavelength division demultiplexer. In another example, the optical transmitters may operate using one wavelength and the optical signals from the OLT 110 may be split by an optical power splitter 116. For example, 256 OLT transmit signals may be carried by fiber 112 and the power from fiber 112 may be split into 256 portions, one for each ONU. In another example, OLT transmit signals for ONUs 130A-130C may be carried from OLT 110 by fiber 112 and the power from fiber 112 may be split at 116 into portions and provided via fibers 132A-132C for each of ONUs 130A-130C.

OLT 110 may further include multiple receivers. For example, OLT 110 may include optical receivers to communicate with each ONU 130A-130C. Each receiver may operate using a different wavelength. The different wavelengths may be carried by multiple fibers such as fibers 132A-132C and multiplexed by WDM 116 onto fiber 112. In another example, 256 OLT receive signals carried by 256 fibers from 256 ONUs may be multiplexed by WDM 116 onto fiber 112. At OLT 110, each optical signal (wavelength)

may be coupled to a different optical detector or multiple wavelengths may be coupled to one detector. In another example, the optical receivers may operate using one wavelength and the optical signals from the multiple ONUs to the OLT 110 may be combined by an optical power combiner 116. For example, 256 OLT receive signals from 256 ONUs may be carried by 256 fibers to combiner 116 and combined onto fiber 112 to OLT 110. In another example, OLT receive signals from ONUs 130A-130C may be carried from ONUs 130A-130C by fibers 132A-132C to power combiner 116, and the combined signal provided to OLT 110 via fiber 112.

Signals passed from the OLT to an ONU may be referred to as a downstream signal, and signals passed from an ONU to the OLT may be referred to as an upstream signal. Power splitters may support time division multiple access (TDMA) where multiple links use the same fiber and signals are separated by time. WDMs support wavelength division multiple access (WDMA) where multiple links may use the same fiber where signals are separated by wavelength.

Optical distribution network (ODN) 120 may include one or more fibers such as fiber 112 connected to OLT 110, one or more WDMs/power splitters, and additional fibers connecting the ONUs to the one or more WDMs/power splitters. For example, fiber 112 may connect the optical hub to WDM 116. Fiber 112 may pass signals from a plurality of transmitters and/or receivers in OLT 110. WDM 116 may break-out the various wavelengths into separate fibers 132A-132C connected to each optical network unit 130A-130C.

Depending on the locations of the optical network units, optical distribution network 120 may include fibers of substantial length. As an illustrative example, OLT 110 may be located at a central office. Fiber 112 may be 3 km long and connect hub 110 to WDM 116. WDM 116 may break-out the signals at various wavelengths into separate signals carried by separate fibers. For example, fiber 132A may connect WDM 116 to optical network unit 130A located 10 km from WDM 116 and carry signals to be received at optical network unit 130A at a first wavelength, and carry signals transmitted from optical network unit 130A on a second wavelength. Fiber 132B may connect WDM 116 to optical network unit 130B located 8 km from WDM 116 and carry signals to be received at optical network unit 130B at a third wavelength, and carry signals transmitted from optical network unit 130B on a fourth wavelength. Fiber 132C may connect WDM 116 to optical network unit 130C located 20 km from WDM 116 and carry signals to be received at optical network unit 130C at a fifth wavelength, and carry signals transmitted from optical network unit 130C on a sixth wavelength. Additional optical network units may be connected via additional fibers to WDM 116. The foregoing example indicated example distances and three optical network units, any other distances and/or number of optical network units may be used as well.

Each optical network unit may be connected to one or more fibers. For example, optical network unit 130A may be connected to fiber 132A. A optical network unit may include an optical transmitter and an optical receiver. The optical transmitter may include an optical source that may be modulated to include data. In some example embodiments the optical source may be coupled to a semiconductor optical amplifier. The power output from the optical source may be adjusted via a bias voltage and the SOA may further adjust the optical power via gain in the SOA coupled to a fiber.

Figure 2:
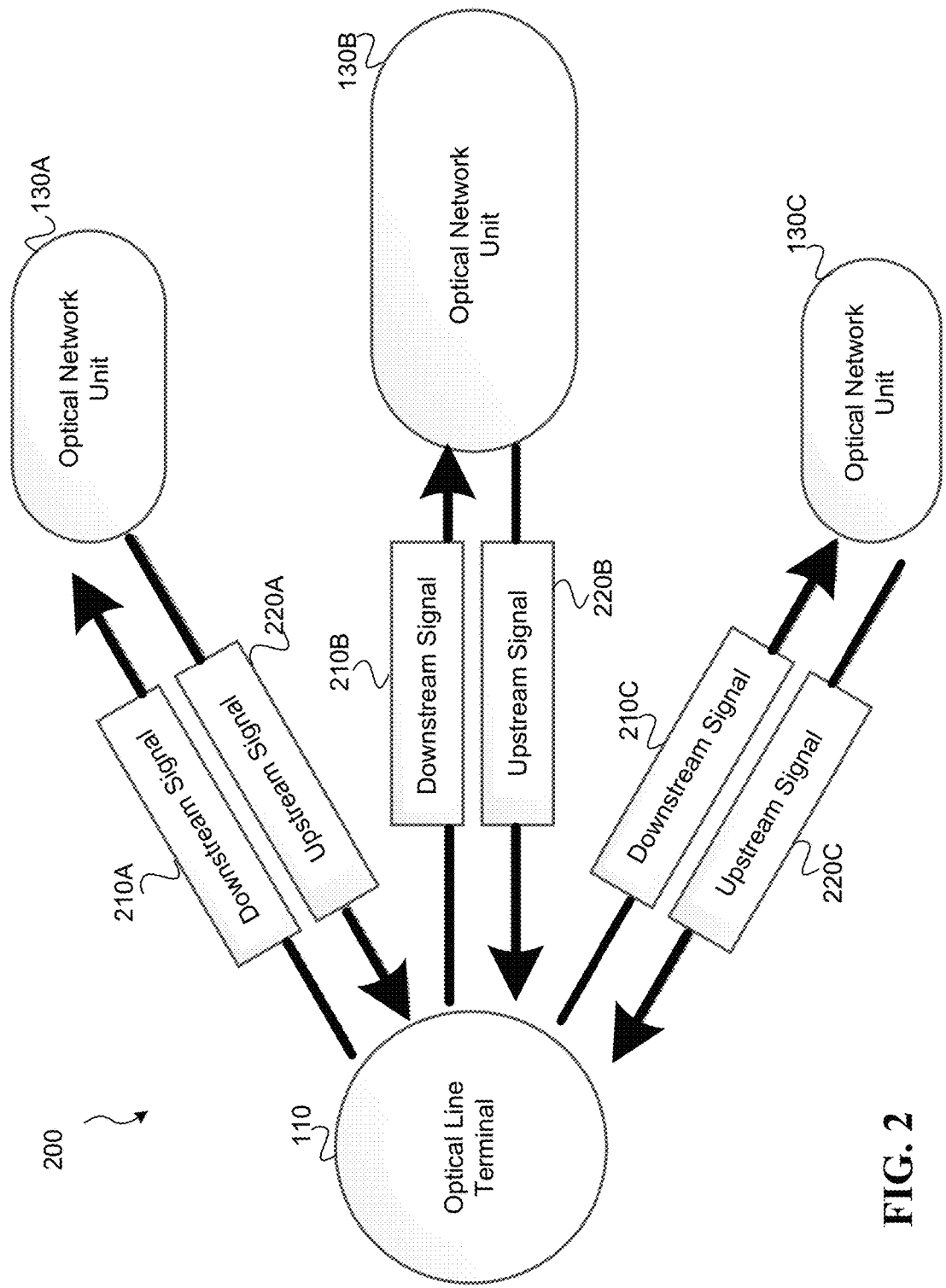
FIG. 2 depicts an example of data flow in an optical network, in accordance with some example embodiments.

FIG. 2 depicts an example of data flow 200 in an optical network, in accordance with some example embodiments. The description of FIG. 2 also refers to FIG. 1. In the example of FIG. 2, OLT 110 may communicate with optical network units 130A-130C by transmitting downstream signals 210A-210C to the optical network units 130A-130C, and receiving upstream signals 220A-220C. Different downstream signals may be sent to the different optical network units 130A-130C and a different upstream signal may be received from the different optical network units 130A-130C at OLT 110. FIG. 2 depicts information/data flow and does not depict a WDM, power splitter, or other optical devices.

In some example embodiments, OLT 110 may transmit a signal of predetermined power and data representative of the predetermined power to each optical network unit such as optical network units 130A-130C. For example, OLT 110 may transmit a downstream signal 210A with an optical power of 1 milliwatt (0 dBm) to optical network unit 130A. The signal may include data representative of the optical power such as a binary number representative of 0 dBm that is modulated onto the optical signal that is transmitted. OLT 110 may transmit the same or similar signal to the other optical network units such as 130B and 130C. Each optical network unit then receives the modulated signal and demodulates the signal to determine the data representative of the power level at the OLT 110. Each optical network unit, using a detector may measure the power received at the node. Due to attenuation of the optical signal in the fibers between the OLT 110 and optical network units 130A-130C, the power received at each optical network unit is less than the power transmitted from the OLT 110. Due to the different distances between the OLT 110 and the optical network units 130A-130C, the measured power may be different at each optical network unit. For example, optical network unit 130A may be 10 km further away from OLT 110 than optical network unit 130B causing a lower power level to be detected at optical network unit 130A compared to optical network unit 130B. The difference between the optical power sent from the OLT 110, which is represented by the data modulated onto the optical signal to each optical network unit, and the power measured at each optical network unit is the optical power loss (also referred to herein as optical path loss) between the optical hub and corresponding optical network unit.

In some example embodiments, each optical network unit may modulate onto an upstream optical link to the hub a data representative of the corresponding optical power loss between the optical network unit and the optical hub. For example, optical network unit 130A may modulate onto upstream signal 220A a data representative of the optical power loss between optical network unit 130A and OLT 110. The modulation may be an analog modulation or a digital modulation and the data may be digital data or an analog representation of the optical power loss. Optical network unit 130B may modulate onto an upstream signal 220B a representation of the optical path loss between optical network unit 130B and OLT 110. Optical network unit 130C may modulate onto an upstream signal 220C a representation of the optical path loss between optical network unit 130C and OLT 110. The power of the upstream optical link may be the same predetermined value at each optical network unit, or different values, or the power of the optical source at each optical network unit may be adjusted in accordance with the optical path loss. For example, optical network units with corresponding greater optical path loss to the optical hub may be adjusted to transmit more power from the optical source to compensate for the additional path loss. In this way OLT 110 receives from each optical network unit 130A-130C the optical path loss between OLT 110 and each of the optical network units.

In some example embodiments, OLT 110 may adjust the dynamic range of the upstream signals 220A-220C by sending commands via the downlink signals 210A-210C to cause one or more of the optical network units 130A-130C to adjust their transmit power. For example, upstream signal 220A may be received at OLT 110 with a power of −10 dBm, upstream signal 220B may be received at OLT 110 with a power of −15 dBm, upstream signal 220C may be received at OLT 110 with a power of −30 dBm. In this example, the dynamic range of the signals received at OLT 110 is 20 dB. To reduce the dynamic range of the signals received, OLT 110 may command optical network unit 130C via downstream signal 210C to increase its transmit power by 8 dB to −22 dBm. With the adjusted power from optical network unit 130C, the dynamic range at OLT 110 is reduced from 20 dB to 12 dB.

In some example embodiments, the optical power produced by multiple optical network units may be adjusted together or separately. For example, one or more of the optical network units may be commanded together to adjust the optical power at the optical node. In some example embodiments, the optical network units may be adjusted together upon system initialization or during operation of the optical network. In another example, the optical network units may be adjusted serially. For example, the source power from a first optical network unit may be adjusted followed by a second unit, and so on. The serial adjustments may include multiple iterations of cycling through the multiple optical network units. In some example embodiments, each iteration may include a minimum increase in power at each node. In another example, the power produced by the multiple optical network units may be produced in a round robin fashion or in a predetermined pattern. In some example embodiments, the adjusting the optical power from an optical network unit may take some time. For example, the time between when a command is sent from the optical hub to the time when the optical power from the optical node is adjusted may be 200 to 600 microseconds. Other times are also possible. In some example embodiments, an additional time may allow the optical power from the optical network unit to settle. In this way, subsequent adjustments to an optical network unit may be spaced in time by an amount at least as long as the adjustment time in addition to the settling time. In some example embodiments, power levels received at the optical hub may be measured in parallel (i.e., the optical power from more than one optical network unit is measured at the hub at a time).

Figure 3:
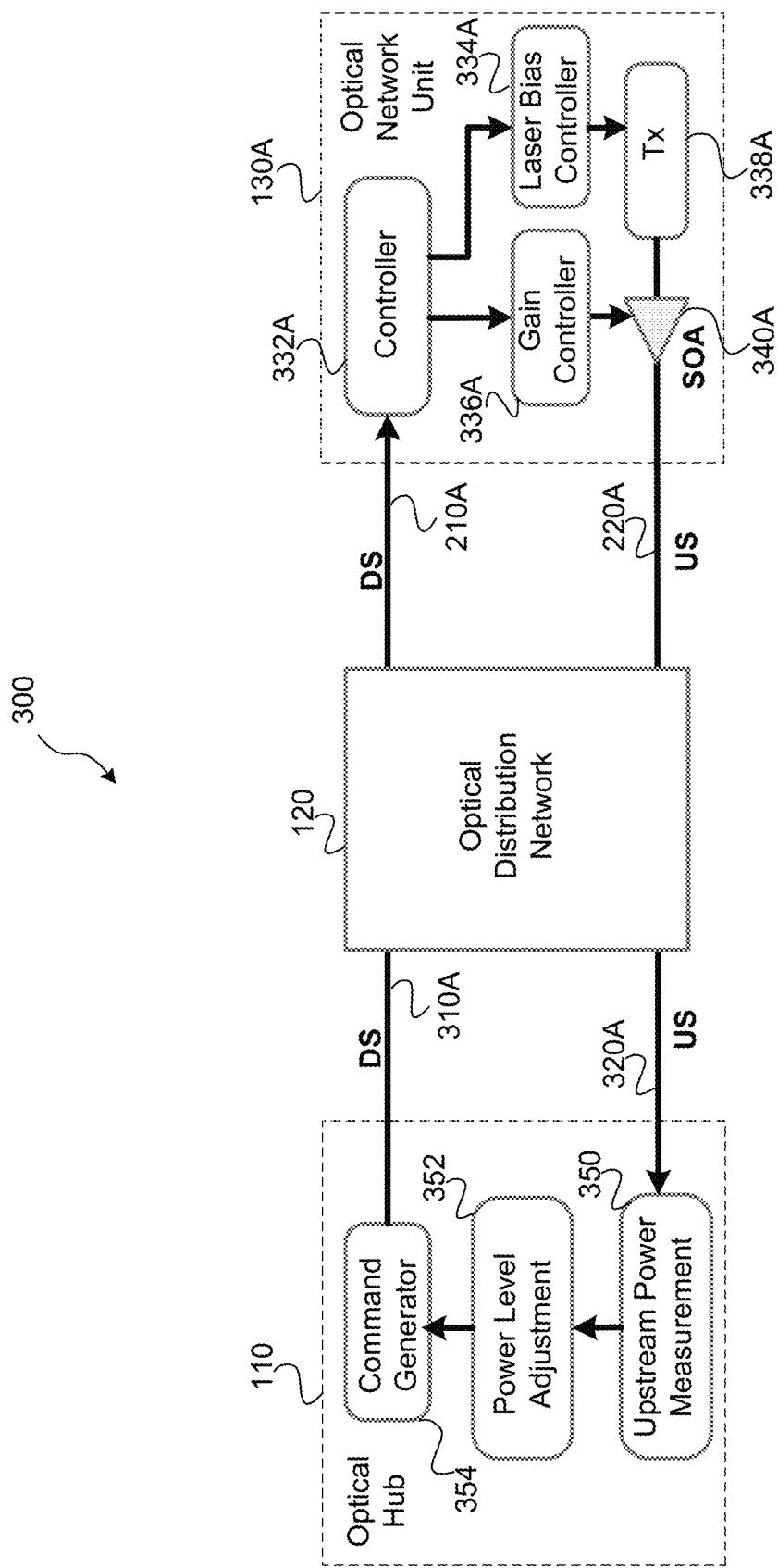
FIG. 3 depicts an example of an optical power control scheme in an optical network, in accordance with some example embodiments.

FIG. 3 depicts an example of an optical power control scheme in an optical network 300, in accordance with some example embodiments. The description of FIG. 3 also refers to the description of FIGS. 1 and 2. Optical network 300 includes OLT 110, optical distribution network 120, and one or more optical network units such as optical network unit 130A. FIG. 3 depicts one optical network unit but any number of optical network units may be connected to optical distribution network 120 and OLT 110.

OLT 110 may receive upstream signal 320A via optical distribution network 120 from optical network unit 130A. Upstream optical signal 320A originated at optical network unit 130A at 220A and passed through optical distribution network 120. Upstream optical signal 320A may include payload data and status information from optical network unit 130A. For example, status data may include an optical path loss between OLT 110 and optical network unit 130A determined by optical network unit 130A.

At 350, OLT 110 may determine the received power from optical network unit 130A with a detector. The power received may be expressed by the following equation:

$$\text{Power}_{Rx}(i) = \text{Power}_{Tx}(i) - \text{OPL}(i), \quad \text{Eq. (1)}$$

where $\text{Power}_{Rx}(i)$ is the power received (detected) at OLT 110 from the ith optical network unit (e.g., optical network unit 130A), $\text{Power}_{Tx}(i)$ is the power transmitted by the ith optical network unit, and OPL(i) is the optical power loss between the hub and the ith optical network unit. In the example of FIG. 3, the power is received from optical network unit 130A where i may equal 1. For example, when the transmitted power, $\text{Power}_{Tx}(1)=0$ dBm, and with the optical path loss, OPL(1)=10 dB, the received power, $\text{Power}_{Rx}(i) = -10$ dBm.

At 352, OLT 110 may include control logic to cause the power received from multiple optical network units such as optical network units 130A-130C in FIG. 2 to transmit signals that when received at OLT 110 lie below an upper threshold power and above a lower threshold. The upper and lower thresholds may accommodate a predetermined maximum difference between the powers received from the various optical network units. The predetermined maximum difference may accommodate small drifts in power levels from optical sources due to temperature or device aging, or changes in loss in the optical distribution network due to temperature or imperfections such as an optical connection affected by dust or moisture. As an illustrative example, the upper threshold may be set to −10 dBm and the lower threshold may be set to −25 dBm. Continuing the example of FIG. 2, where upstream signal 220A may be received at OLT 110 with a power of −10 dBm, upstream signal 220B may be received at OLT 110 with a power of −15 dBm, and upstream signal 220C may be received at OLT 110 with a power of −30 dBm. In this example the optical power received from optical network unit 130C is outside the acceptable range of the upper and lower thresholds and should be adjusted to be within the acceptable range.

At 354, OLT 110 may send a command to optical network unit 130C via downstream signal 210C to increase its transmit power by 8 dB to −22 dBm. The power from optical network unit 130C then lies within the upper and lower thresholds. The command may be included in a modulated downstream signal sent via 310A through optical distribution network 120 and 210A to controller 332A.

Controller 332A may include and optical detector and demodulator to generate payload data and determine commands sent from OLT 110. For example, commands may be received from OLT 110 to adjust the power of the upstream signal generated by optical network unit 130A. In some example embodiments, OLT 110 may command optical network unit 130A to adjust the gain at 236A of a semiconductor optical amplifier (SOA) 340A. OLT 110 may command an adjustment via laser bias control 334A to cause an adjustment in the power produced by an optical source such as a laser in transmitter 338A. The power received at OLT 110 may be represented by the following equation:

$$\text{Power}_{Rx}(i)' = \text{Power}_{Tx}(i) + \Delta P(i) + \text{Gain}(i) - \text{OPL}(i), \quad \text{Eq. (2)}$$

where $\text{Power}_{Rx}(i)'$ is the power received at the OLT 110, $\text{Power}_{Tx}(i)$ is an initial power transmitted by the ith optical network unit (e.g., optical network unit e130A), $\Delta P(i)$ is a change in optical power generated by the source in a ith transmitter, Gain(i) is the gain provided by the ith SOA, and OPL(i) is the optical path loss from OLT 110 to the ith optical network unit through optical distribution network 120. Adjusting the source transmit power at 336A or adjusting the gain of a corresponding SOA at 334A may cause the power received from an optical network unit to lie between an upper and lower threshold. Using FIGS. 2 and 3 as illustrative examples, OLT 110 may send a command to optical network unit 130C via downstream signal 210C to increase its transmit power by 8 dB from −30 dBm to −22 dBm using a combination of adjusting the source transmit power represented by ΔP(i) in Equation 2, and SOA gain represented by Gain(i) in Equation 2. In some example embodiments, an optical source may have a limited range of output power adjustment while maintaining a required signal to noise ratio. For example, a laser diode may have 4 dB of adjustment range although other adjustment ranges are also possible. In some example embodiments, the adjustment range of an SOA may be greater than the adjustment range of the laser diode output power. For example an SOA may have a 10 dB adjustment range. The total adjustment to the optical power provided to the optical distribution network at 220A is the product of the laser diode power adjustment and the SOA gain range. In the foregoing example, the total adjustment is 4 dB+10 dB=14 dB. OLT 110 may proportion the adjustment between the laser power adjustment and the SOA gain adjustment according to an algorithm. For example, to achieve a 6 dB increase in power, the SOA controller 336A may be commanded by the OLT 110 to increase gain of SOA 340A by 3 dB, and the laser bias controller 334A may be commanded by OLT 110 to increase the power on the optical source in transmitter 338A by 3 dB. Other combinations of SOA gain and optical source power adjustment are also possible to cause 6 dB increase at 220A in foregoing example. In other examples, a decrease in optical power may be commanded by OLT 110. In some example embodiments, adjusting the optical power may enable using different forward error correction codes. For example, raising the optical power and signal to noise ratio at receiver enables the use of a code with less coding gain (e.g., Reed-Solomon(255, 239) instead of a code with higher coding gain).

Figure 4:
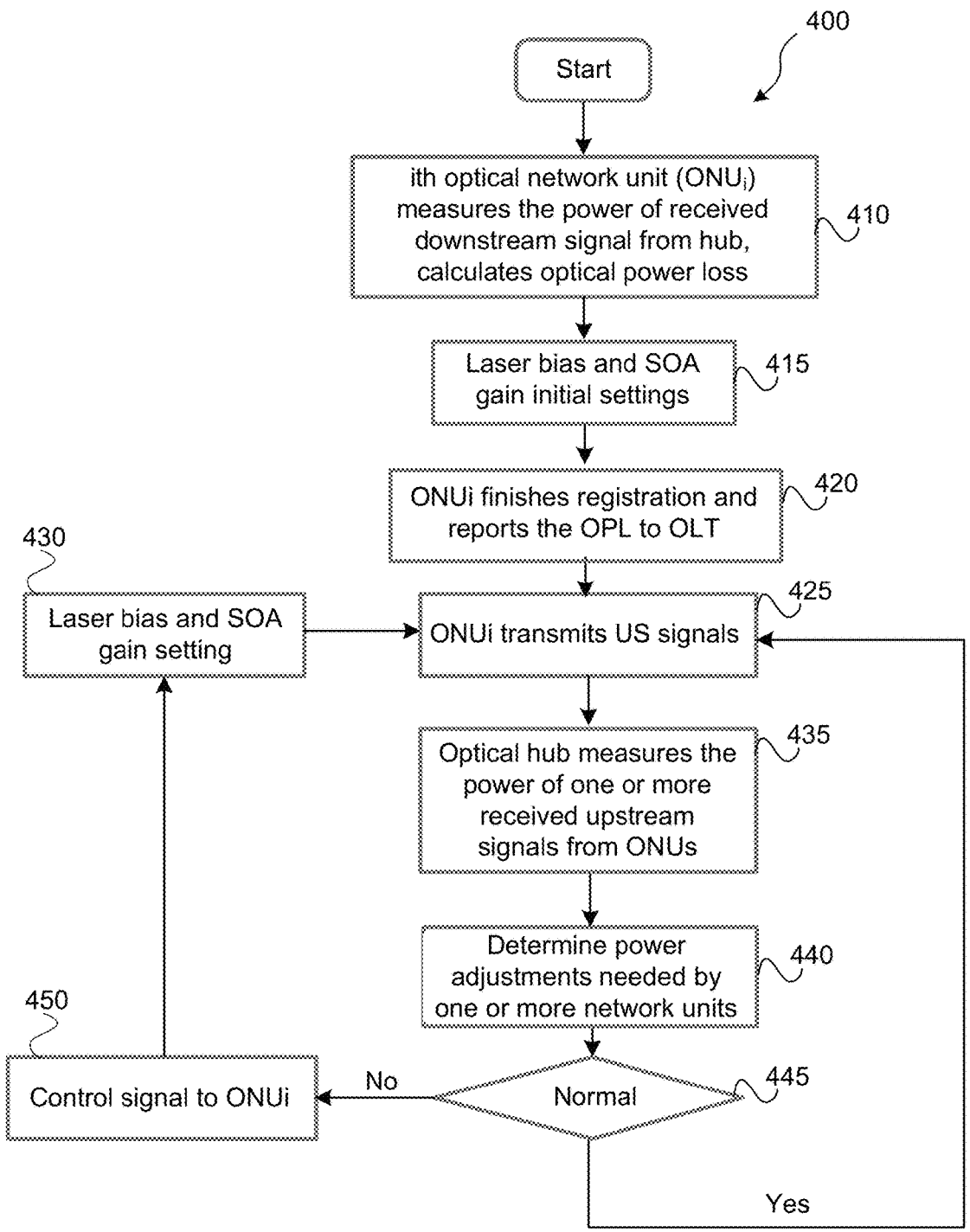
FIG. 4 depicts an example of a process, in accordance with some example embodiments.

FIG. 4 depicts an example of a process, in accordance with some example embodiments. The description of FIG. 4 also refers to the description of FIGS. 1-3. At 410, an optical network unit measures the power of a downstream signal from an optical hub and receives data representative of the power sent from the optical hub. At 415, the laser bias controller sets a starting power for the optical source and the gain controller sets a starting gain for the SOA. At 420, the optical network unit registers with the optical hub and sends data representative of the optical path loss to the optical hub. At 425, the optical network unit may transmit upstream signals to the optical hub. At 435, the optical hub may measure the optical power of the upstream signal from the optical network unit. At 440, the optical hub may determine adjustments required in transmit power from one or more of the registered optical network units. At 445, if no adjustments are needed, the optical hub continues to monitor the optical power received from each optical network unit. If adjustments are needed, one or more commands are sent at 450 to one or more optical network units to adjust the optical powers. At 430, the adjustments to laser bias and/or optical gain are received at the optical network units to cause changes in the optical powers from each optical network unit that requires a change. The process depicted in FIG. 4 may be performed for each optical network unit when a new system is started, may be performed when a new optical network unit is added to a system, and may be performed at various times while a system is operating. For example, the process may be performed on all optical network units once per month or any other periodic or intermittent time.

At 410, an optical network unit measures the power of a downstream signal sent from the optical hub and receives data representative of the power sent from the optical hub. As described above with respect to FIG. 2, an optical network unit may determine the optical path loss between the optical network unit and the optical hub from the measured power of the signal received at the optical network unit and the data including the representation of the power sent from the optical hub.

At 415, the laser bias controller sets a starting power for the optical source and the gain controller sets a starting gain for the SOA. The starting power and starting gain may be fixed values, or one or both may be determined by the OLT 110 and sent to one or more optical network units as a starting power. For example, the starting power may be −3 dBm and the starting gain may be 3 dB to produce an optical power of 0 dBm. In some example embodiments, the starting power and starting gain may be adjusted according to the optical path loss between the optical network unit and the optical hub. For example, if the optical path loss exceeds a predetermined value, the optical network unit may adjust the starting gain and/or starting optical power to cause at least a minimum power to be received at the optical hub. Each optical network unit connected to the optical hub may set a starting gain and starting optical power as described above.

At 420, the optical network unit may register with the optical hub and send data representative of the optical path loss to the optical hub. For example, an optical network unit may send data representative of an identifier for the optical network unit in the upstream signal. Each optical network unit connected to the optical hub may similarly send a different identifier to identify each optical network unit. Each optical network unit connected to the optical hub may send data representative of the optical path loss between the corresponding optical network unit and the optical hub.

At 425, each optical network unit may transmit upstream signals to the optical hub including payload data. At 435, the optical hub may measure the optical power of the upstream signal one or more connected optical network units. In the example of FIG. 2, upstream signal 220A may be received at OLT 110 with a power of −10 dBm, upstream signal 220B may be received at OLT 110 with a power of −15 dBm, upstream signal 220C may be received at OLT 110 with a power of −30 dBm. In this example, the dynamic range of the signals received at OLT 110 is 20 dB.

At 440, the optical hub may determine adjustments required in transmit power from one or more of the registered optical network units. Continuing the example at 425, to reduce the dynamic range of the signals received, OLT 110 may need to command optical network unit 130C via downstream signal 210C to increase its transmit power by 8 dB to −22 dBm. With the adjusted power from optical network unit 130C, the dynamic range at OLT 110 is reduced from 20 dB to 12 dB.

In another example, in order to have a predetermined maximum dynamic range at the OLT 110, multiple optical network units may be adjusted. The adjustment of multiple optical network units may occur when a new optical network unit is added with greater optical path loss than the other optical network units connected to the optical hub. For example, signal 220A may be received at OLT 110 with a power of −10 dBm, upstream signal 220B may be received at OLT 110 with a power of −15 dBm, upstream signal 220C may be received at OLT 110 with a power of −30 dBm. A new optical network unit may be added with an optical power at OLT 110 of −40 dBm. In this example, the dynamic range of the signals received at OLT 110 is 30 dB (the difference between −10 dBm and −40 dBm). To reduce the dynamic range of the signals received, OLT 110 may command the new optical network unit via a corresponding downstream signal to increase its transmit power by 18 dB to reach a dynamic range of 12 dB but the new optical network unit may not have sufficient power to adjust by 18 dB. For example, the new node may be able to adjust its transmit power by a maximum of 4 dB increased optical power and SOA by a maximum of 10 dB of gain. Accordingly, the maximum power that may possibly be received from the new optical network unit may be −26 dBm. To reduce the dynamic range of signals received from all the optical network units, the optical power from optical network unit 130A may be adjusted down. For example, the optical power and gain at optical network unit 130A may be reduced by 4 dB to lower the power received form optical network unit 130A by 4 dB to −14 dB. The optical power and gain at optical network unit 130B may be left unadjusted at −15 dB. With the foregoing adjustment, the dynamic range is reduced to 12 dB (between −14 dBm and −26 dBm). The foregoing example is an illustration only. Different power levels, differences in received power from various connected optical network units, and number of adjusted optical network units may also be accommodated.

At 445, if no adjustments are needed, the optical hub may continue to monitor the optical power received from each optical network unit. For example, the optical hub may monitor the optical power from each optical network unit continuously, periodically, or intermittently. If adjustments are needed as described above, at 450 one or more commands are sent to one or more optical network units to adjust the optical powers. At 430, the adjustments to laser bias and/or optical gain are received at the optical network units to cause required changes in optical power from each optical network unit that requires a change.

Figure 5:
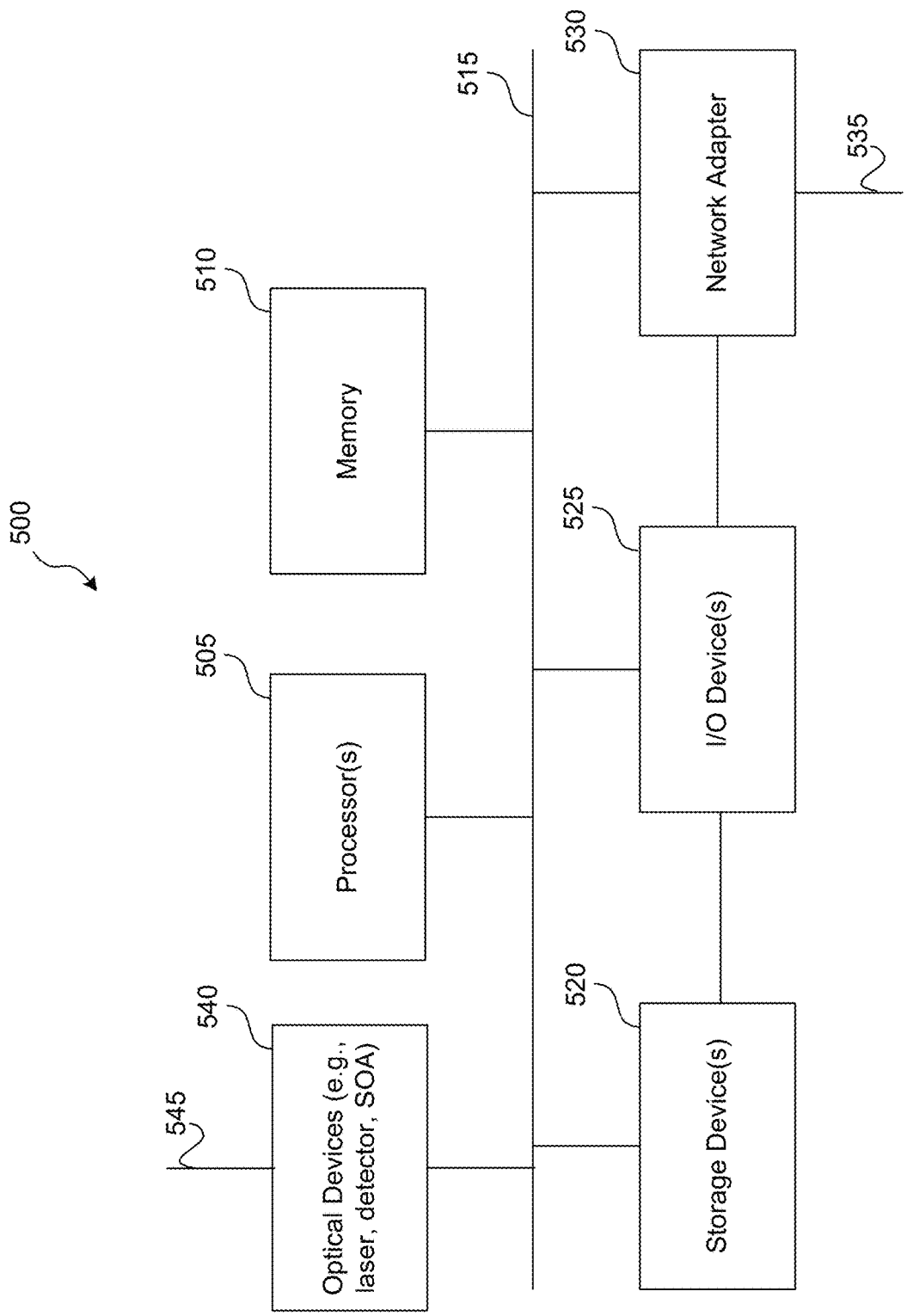
FIG. 5 depicts an example of an apparatus, in accordance with some example embodiments.

FIG. 5 depicts an example of an apparatus 500, in accordance with some example embodiments. The description of FIG. 5 also refers to FIGS. 1-4. Operations and management of the disclosed optical network unit such as optical network units 130A-130C and OLT 110 may include an apparatus such as 500. In an optical network unit, apparatus 500 may perform one or more of a controller such as controller 332A, a gain controller such as gain controller 336A, a laser bias controller such as laser bias controller 334A. Apparatus 500 may also perform other status and control functions and include interfaces to other devices. In an optical hub, apparatus 500 may determine power level adjustments at 352, generate commands to be send to one or more optical network units, and receive and operate on information received from the optical network units. FIG. 5 at 500 is a block diagram of a computing system, consistent with various embodiments such as the optical network unit(s) and/or optical hub described above.

The computing system 500 may include one or more central processing units ("processors") 505, memory 510, input/output devices 525 (e.g., keyboard and pointing devices, display devices), storage devices 520 (e.g., disk drives), and network adapters 530 (e.g., network interfaces) that are connected to an interconnect 515. Apparatus 500 may further include optical devices 540 including one or more of lasers, detectors, semiconductor amplifiers, and other optical and optoelectronic components. Optical devices 540 may connect to an optical network, optical hub, or optical network unit via one or more fibers 545. The interconnect 515 is illustrated as an abstraction that represents any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 510 and storage devices 520 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 510 can be implemented as software and/or firmware to program the processor(s) 505 to carry out actions described above. In some embodiments, such software or firmware may be initially provided to the processing system 500 by downloading it from a remote system through the computing system 500 (e.g., via network adapter 530 or optical devices 540).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. An optical network system, comprising:
   an optical hub including an optical detector;
   a first optical node including a first optical source coupled to the optical hub through a first optical fiber having a first optical path loss;
   a second optical node including a second optical source coupled to the optical hub through a second optical fiber having a second optical path loss; and
   an optical distribution network including a power splitter or a wavelength division multiplexer, the first fiber, and the second fiber,
      wherein the optical detector determines a first optical power received from the first optical source through the first optical fiber,
      wherein the optical detector determines a second optical power received from the second optical source through the second optical fiber,
      wherein the optical hub compares the first optical power to the second optical power, wherein when the first optical power exceeds the second optical power by a predetermined threshold, the optical hub generates a message to be sent to the first optical node to cause an adjustment to the first optical power to exceed the second optical power by less than the predetermined threshold, and wherein the message includes a command to adjust an optical power of a laser at the first optical node or a command to adjust a gain of an optical amplifier at the first optical node.

2. The optical network system of claim 1, wherein the first optical node sends a message to the optical hub indicative of the first optical path loss and the second optical node sends another message to the optical hub indicative of the second optical path loss, wherein the hub determines the adjustment based on the first optical path loss and the second optical path loss.

3. The optical network system of claim 1, wherein the first optical node registers with the optical hub by sending a first identifier and the second optical node registers with the optical hub by sending a second identifier.

4. The optical network system of claim 1, wherein the wavelength division multiplexer separates downstream signals from the optical hub to the first and second optical nodes according to wavelength and combines upstream signals of different wavelengths from the first optical node and second optical node.

5. The optical network system of claim 1, wherein the downstream signals from the optical hub to the first and second optical nodes are separated in time and the power in the downstream signals from the optical hub is split by a power splitter into portions to the first and second optical nodes, and the power splitter combines upstream signals separated in time from the first optical node and second optical node to provide to the optical hub.

6. The optical network system of claim 1, wherein the first optical fiber is longer than the second optical fiber causing the first optical path loss to be greater than the second optical path loss.

7. A method, comprising:
   determining, by an optical detector at an optical hub, a first optical power received from a first optical source at a first optical node through a first optical fiber;
   determining, by the optical detector at the optical hub, a second optical power received from a second optical source at a second optical node through a second optical fiber;
   comparing, at the optical hub, the first optical power to the second optical power; and
   generating, at the optical hub when the first optical power exceeds the second optical power by a predetermined threshold, a message to be sent to the first optical node to cause an adjustment to the first optical power to exceed the second optical power by less than the predetermined threshold.

8. The method of claim 7, wherein the message includes a command to adjust an optical power of a laser at the first optical node.

9. The method of claim 7, wherein the message includes a command to adjust a gain of an optical amplifier at the first optical node.

10. The method of claim 7, wherein the first optical node sends a message to the optical hub indicative of the first optical path loss and the second optical node sends another message to the optical hub indicative of the second optical path loss, wherein the hub determines the adjustment based on the first optical path loss and the second optical path loss.

11. The method of claim 7, wherein the first optical node registers with the optical hub by sending a first identifier and the second optical node registers with the optical hub by sending a second identifier.

12. The method of claim 7, wherein the wavelength division multiplexer separates downstream signals from the optical hub to the first and second optical nodes according to wavelength and combines upstream signals of different wavelengths from the first optical node and second optical node.

13. The method of claim 7, wherein the downstream signals from the optical hub to the first and second optical nodes are separated in time and the power in the downstream signals from the optical hub is split by a power splitter into portions to the first and second optical nodes, and the power splitter combines upstream signals separated in time from the first optical node and second optical node to provide to the optical hub.

14. The method of claim 7, wherein the first optical fiber is longer than the second optical fiber causing the first optical path loss to be greater than the second optical path loss.

15. An optical communication apparatus comprising:
at least one processor configured to implement a method comprising:
determining a first optical power received from a first optical source at a first optical node through a first optical fiber;
determining a second optical power received from a second optical source at a second optical node through a second optical fiber;
comparing the first optical power to the second optical power; and
generating, in response to the first optical power exceeding the second optical power by a predetermined threshold, a message to cause an adjustment to the first optical power to exceed the second optical power by less than the predetermined threshold.

16. The optical communication apparatus of claim 15, wherein the message includes a command to adjust an optical power of a laser.

17. The optical communication apparatus of claim 15, wherein the message includes a command to adjust a gain of an optical amplifier.

18. An optical communication apparatus, comprising:
at least one memory;
at least one processor; and
an optical transceiver, wherein the processor is configured to read instructions from the memory and implement an optical communication method, the instructions comprising:
code for determining a first optical power received from a first optical source at a first optical node through a first optical fiber;
code for determining a second optical power received from a second optical source at second optical node through a second optical fiber;
code for comparing the first optical power to the second optical power; and
code for generating, in case of the first optical power exceeding the second optical power by a predetermined threshold, a message to be sent to the first optical source to cause an adjustment to the first optical power to exceed the second optical power by less than the predetermined threshold.

19. The apparatus of claim 18, wherein the instructions further include code for receiving a message indicative of the first optical path loss and another message indicative of the second optical path loss, and determining the adjustment based on the first optical path loss and the second optical path loss.

20. The apparatus of claim 18, wherein the instructions further include code for registering the first optical source and the second optical source based on receiving sending a first identifier and a second identifier.

21. An optical system, comprising:
an optical hub including an optical detector,
wherein the optical detector determines a first optical power received from a first optical source at a first optical node through a first optical fiber,
wherein the optical detector determines a second optical power received from a second optical source at a second optical node through a second optical fiber,
wherein the optical hub compares the first optical power to the second optical power, wherein when the first optical power exceeds the second optical power by a predetermined threshold, the optical hub generates a message to be sent to the first optical node to cause an adjustment to the first optical power to exceed the second optical power by less than the predetermined threshold, and wherein the message includes a command to adjust an optical power of a laser at the first optical node, or a command to adjust a gain of an optical amplifier at the first optical node.

22. The optical network system of claim 21, wherein the optical hub receives a message from the first optical node indicative of the first optical path loss and another message from the second optical node indicative of the second optical path loss, wherein the optical hub determines the adjustment based on the first optical path loss and the second optical path loss.

23. The optical network system of claim 21, wherein the optical hub registers the first optical node by receiving a first identifier and the second optical node by receiving a second identifier.

* * * * *